Jan. 30, 1923.

M. R. GILL.
AUTOMOBILE FILLING FUNNEL.
FILED DEC. 15, 1921.

1,443,466.

Inventor
Margaret R. Gill,
By
Attorney

Patented Jan. 30, 1923.

1,443,466

UNITED STATES PATENT OFFICE.

MARGARET R. GILL, OF CHATTANOOGA, TENNESSEE.

AUTOMOBILE FILLING FUNNEL.

Application filed December 15, 1921. Serial No. 522,621.

*To all whom it may concern:*

Be it known that I, MARGARET R. GILL, a citizen of the United States of America, and resident of Chattanooga, in the county of Hamilton and State of Tennessee, have invented certain new and useful Improvements in Automobile Filling Funnels, of which the following is a specification.

This invention relates to automobiles, and particularly to that type of automobile having a gasoline tank under the seat, the filling mouth of which is concealed by the seat and requires the removal of the seat before access to the said filling mouth can be attained. Certain types of automobiles have filling tanks of the character indicated and to supply fuel or gasoline to them requires that the occupants of the seat shall move in order that the seat may be taken up, and this condition results in inconvenience and confusion, especially when the automobile is loaded with merchandise and the like.

An object of this invention is to provide novel means whereby filling tanks of the character indicated may be supplied with gasoline from the side of the automobile body, means being provided whereby the delivery funnel or hose may be inserted in a tube leading to the said fuel tank.

It is a further object of this invention to provide novel means for closing the end of the filling tube by a device which will be inconspicuous and which will not interfere with the loading or unloading of the automobile.

With the foregoing and other objects in view, the invention consists in the details of construction, and in the arrangement and combination of parts to be hereinafter more fully set forth and claimed.

In describing the invention in detail, reference will be had to the accompanying drawings forming part of this application wherein like characters denote corresponding parts in the several views, and in which—

Figure 1:
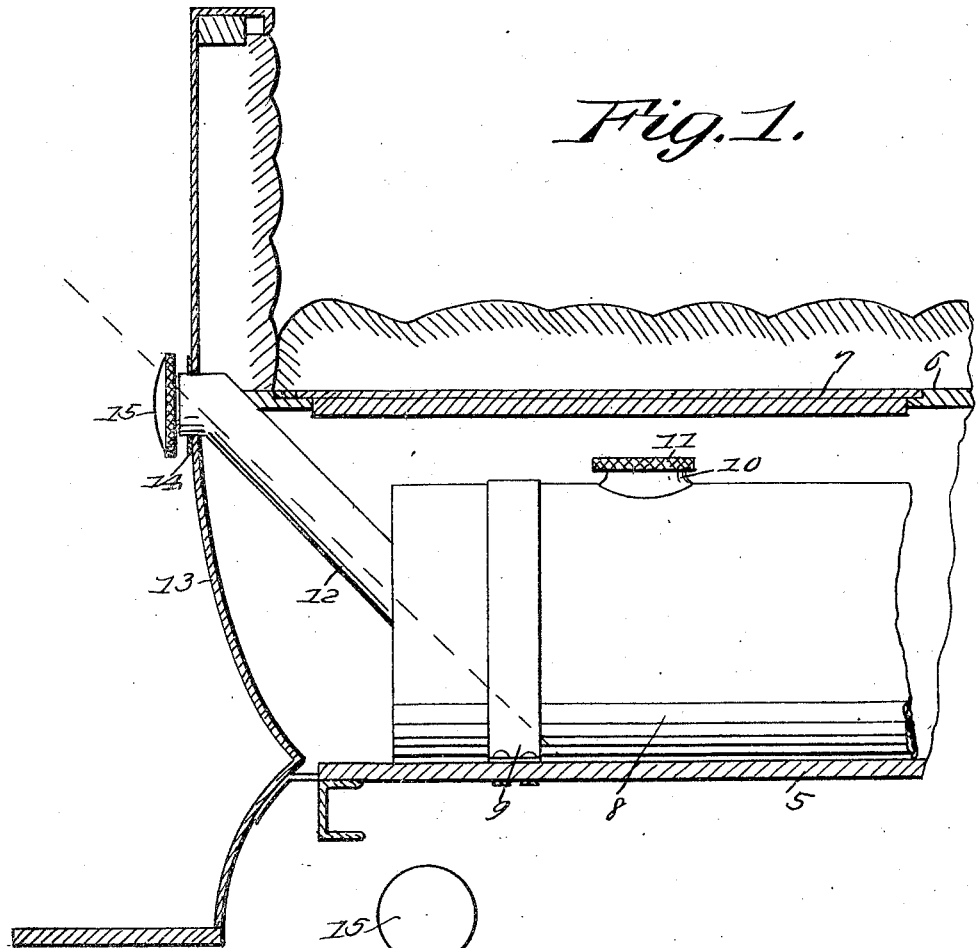
Figure 2:
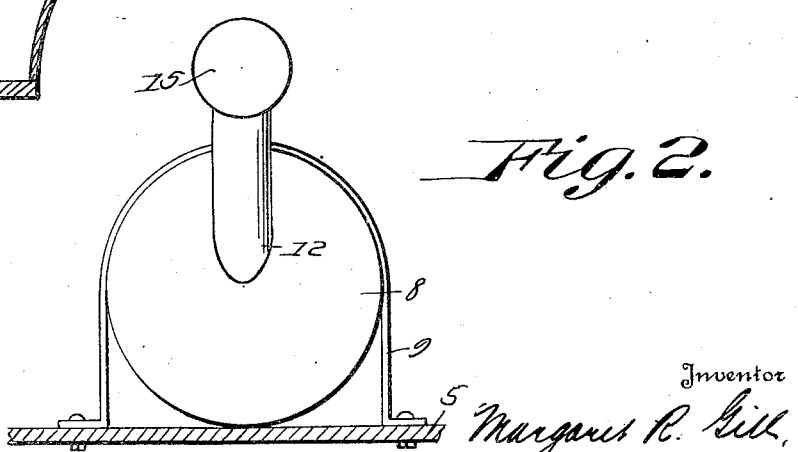

Figure 1 illustrates a transverse sectional view of a seat and body of an automobile, one of the sides being broken away; and Figure 2 illustrates a detailed view of the filling tank and spout.

In these drawings 5 denotes the floor of an automobile body, 6 the seat thereof, having a removable section 7 for the purpose of allowing access to the tank 8 which is under the seat, the said tank being held in place by strap fastenings 9, as shown. The tank 8 has the usual filling mouth 10, closed by a screw cap 11, and auxiliary to this means for the reception of the gasoline, the end of the tank, in the present embodiment of the invention, is supplied with a spout 12 communicating with the interior of the tank and extending through the side of the body 13 of the automobile, the said spout preferably terminating above the top of the tank in order to prevent the contents of the tank from reaching the outer end of the spout when the automobile body is in motion.

The outer end of the spout projects slightly through an opening 14 in the side of the automobile body and its outer end is provided with a closure or cap 15 which may be attached in place on or in the end of the spout in any appropriate way, it being the purpose of the inventor that this cap shall be readily removable to permit the insertion of a delivery pipe or funnel by which gasoline can be supplied through the spout to the tank.

By means of this invention, it will be observed that the receiving end of the spout is at the side of the automobile body where it will be accessible from the curb of a street or where it will be readily accessible for inserting hose of pump dispensing gasoline stations.

The improvement or invention can be supplied to tanks now in common use and can also, of course, be installed in connection with new constructions at a comparatively small increased cost.

The relation of parts is such that the operator of the automobile may, without leaving the seat, remove the closure or cap 15; and the relation of parts is furthermore such that the automobile operator may insert a rule in the spout 12, as shown by the dotted line to measure the contents of the tank. To the end that the measurement might be taken, the outwardly disposed angular portion of the spout is comparatively short, in order that a clearance may be produced for the reception of the rule or measuring device.

I claim:

An automobile tank adapted to be located under a seat of an automobile having a spout of practically uniform diameter throughout its length communicating with one end of the tank and extending upwardly and outwardly diagonally with respect to the axis of the tank, and adapted to project through the side of the body of the automobile, the projecting portion of the spout being at an angle to the diagonally disposed portion and so positioned as to form an unobstructed passage for a rigid device from the outer end of the pipe to the bottom of the tank, and a closure for the outer end of said spout.

MARGARET R. GILL.